United States Patent
Camet et al.

(10) Patent No.: US 9,810,900 B2
(45) Date of Patent: Nov. 7, 2017

(54) DEFORMABLE MIRROR HAVING A LOW BONDING FOOTPRINT AND PROCESS FOR MANUFACTURING SUCH A MIRROR

(75) Inventors: Sebastien Marin Michel Camet, Meylan (FR); Jean-Francois Yves Curis, Domene (FR); Frederic Christian Robert Rooms, Biviers (FR)

(73) Assignee: ALPAO, Montbonnot-Saint-Martin (FR)

( * ) Notice: Subject to any disclaimer, the term of this patent is extended or adjusted under 35 U.S.C. 154(b) by 576 days.

(21) Appl. No.: 13/638,097

(22) PCT Filed: Apr. 5, 2011

(86) PCT No.: PCT/FR2011/050761
§ 371 (c)(1),
(2), (4) Date: Dec. 4, 2012

(87) PCT Pub. No.: WO2011/124838
PCT Pub. Date: Oct. 13, 2011

(65) Prior Publication Data
US 2013/0070356 A1    Mar. 21, 2013

(30) Foreign Application Priority Data
Apr. 6, 2010 (FR) .................................. 10 52599

(51) Int. Cl.
*G02B 7/183* (2006.01)
*G02B 26/08* (2006.01)
*G02B 26/06* (2006.01)

(52) U.S. Cl.
CPC ......... *G02B 26/0825* (2013.01); *G02B 7/183* (2013.01); *G02B 26/06* (2013.01); *G02B 26/085* (2013.01)

(58) Field of Classification Search
CPC .... G02B 7/183; G02B 26/06; G02B 26/0825; G02B 26/085; G02B 26/0858
(Continued)

(56) References Cited

U.S. PATENT DOCUMENTS 2,555,387 A * 6/1951 Zobel ..................... G01N 21/45
356/520
3,904,274 A * 9/1975 Feinleib et al. .............. 359/295
(Continued)

FOREIGN PATENT DOCUMENTS

JP          8248214 A      9/1996
WO    WO2004/057407      8/2004

OTHER PUBLICATIONS

Search Report for PCT Application No. PCT/FR2011/050761 mailed Sep. 7, 2011.

*Primary Examiner* — Ricky D Shafer
(74) *Attorney, Agent, or Firm* — Pearl Cohen Zedek Latzer Baratz LLP

(57) ABSTRACT

The invention relates to a deformable mirror comprising a deformable membrane (2) having a reflecting face (3) and being mounted on a support provided with at least one actuator designed to deform said membrane (2), said actuator comprising at least one movable member (7) fixed to the membrane (2) via an adhesive joint (8) and having a main body (11) located away from the adhesive joint (8), said body being extended by an active part (12) that penetrates said adhesive joint (8) partly or completely in such a way that the adhesive spreads over the concealed face (4), parallel to the reflecting face (3), and adheres at least partly to the side wall (14) of said active part (12), this part (12) forming a tip (32) limiting the bonding footprint on said reflecting face (3). Deformable mirror for adaptive optics.

18 Claims, 2 Drawing Sheets

(58) Field of Classification Search
USPC .................................. 359/846, 849, 900
See application file for complete search history.

(56) References Cited

U.S. PATENT DOCUMENTS

| | | | | |
|---|---|---|---|---|
| 4,655,563 | A * | 4/1987 | Plante et al. | 359/849 |
| 4,674,848 | A * | 6/1987 | Aldrich et al. | 359/845 |
| 4,679,915 | A * | 7/1987 | Kriz et al. | 359/845 |
| 4,940,318 | A * | 7/1990 | Ealey et al. | 359/849 |
| 5,037,184 | A * | 8/1991 | Ealey | 359/849 |
| 5,434,697 | A * | 7/1995 | Ameer | 359/224.1 |
| 5,535,043 | A | 7/1996 | La Fiandra et al. | |
| 5,751,503 | A | 5/1998 | Blackmon et al. | |
| 6,217,178 | B1 * | 4/2001 | Drumheller et al. | 359/849 |
| 6,236,490 | B1 * | 5/2001 | Shen | 359/247 |
| 7,518,780 | B2 * | 4/2009 | Papavasiliou et al. | 359/290 |
| 7,547,107 | B2 * | 6/2009 | Cavaco et al. | 359/849 |
| 2003/0030922 | A1 | 2/2003 | Menck | |
| 2011/0211268 | A1 * | 9/2011 | Camet et al. | 359/849 |

* cited by examiner

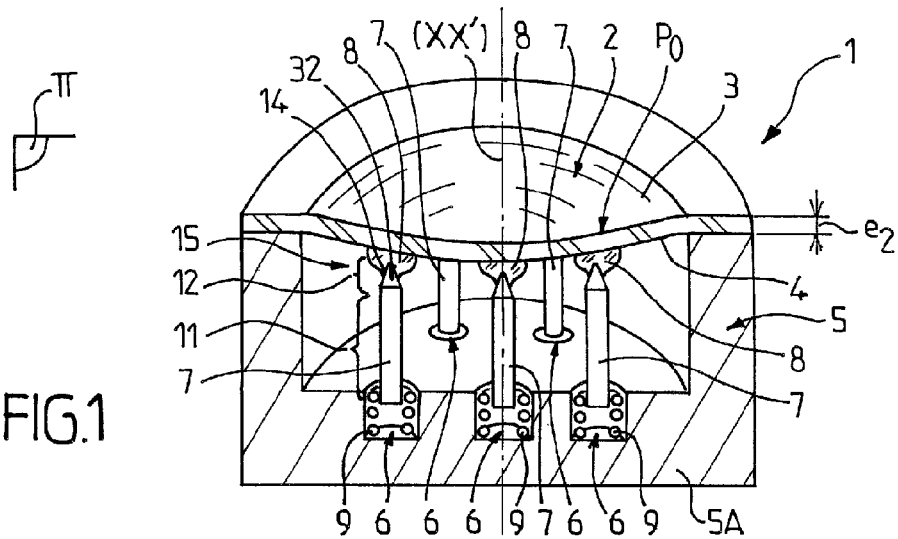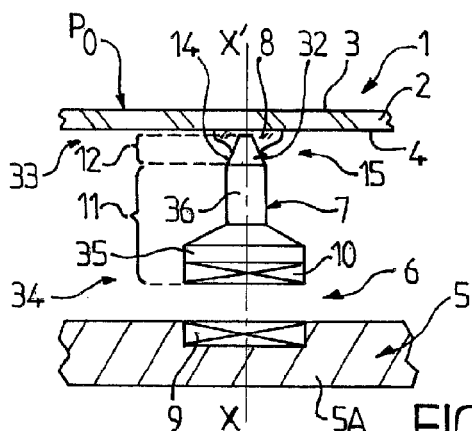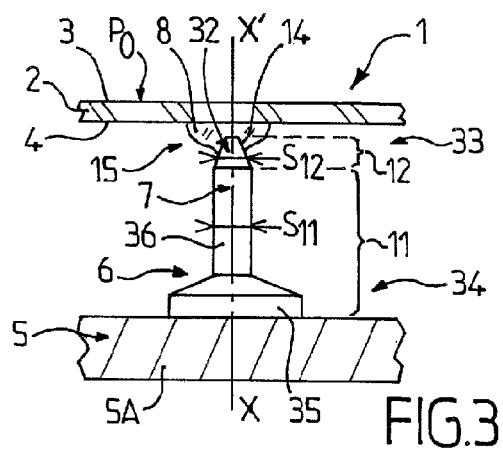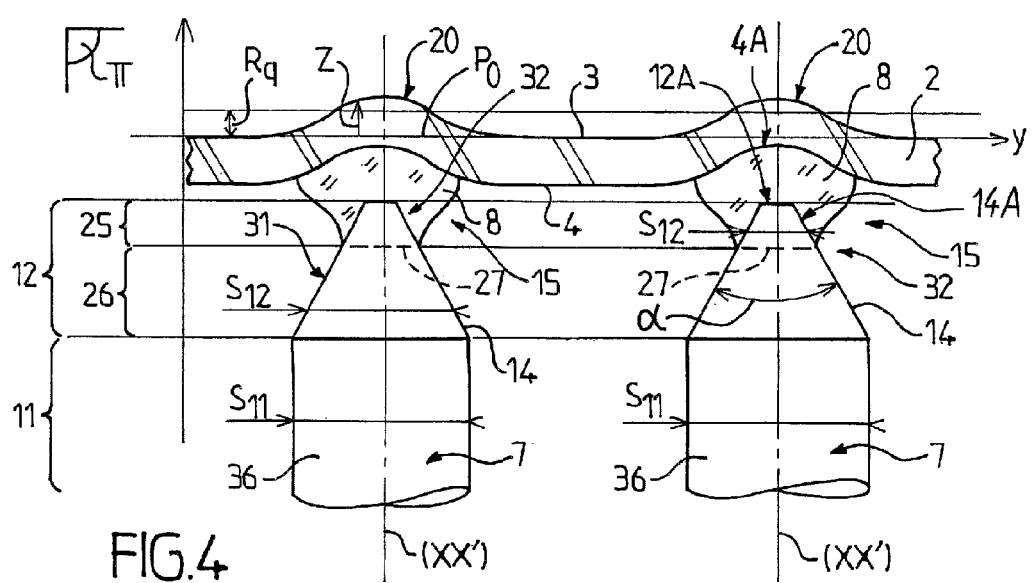

DEFORMABLE MIRROR HAVING A LOW BONDING FOOTPRINT AND PROCESS FOR MANUFACTURING SUCH A MIRROR

CROSS-REFERENCE TO RELATED APPLICATIONS

This application is a National Phase Application of PCT International Application No. PCT/FR2011/050761, International Filing Date Oct. 13, 2011, claiming priority of French Patent Application No. 1052599, filed Apr. 6, 2010, which is hereby incorporated by reference.

TECHNICAL FIELD

The present invention relates to the general field of deformable mirrors used in adaptive optical systems, for applications as diverse as astronomy, medicine, in particular ophthalmology, telecommunications, metrology, etc.

The present invention more particularly relates to a deformable mirror comprising a deformable membrane having a reflecting face, said membrane being mounted on a support provided with at least one actuator adapted to deform said membrane, said actuator comprising at least one movable member fixed to the membrane by an adhesive joint.

The present invention also relates to a method for manufacturing a deformable mirror comprising a deformable membrane having a reflecting face, wherein a movable member of an actuator, adapted to locally deform said membrane, is adhesively fixed to said membrane.

PRIOR ART

It is known to use deformable mirrors to correct the irregularities of the wave front of a light beam.

For that purpose, such deformable mirrors are provided with a flexible reflecting surface, generally formed by a membrane, to the back of which are connected actuators capable of locally maneuvering the membrane forwards and backwards, and modifying the optical path traveled by the various rays constituting the beam that reflects onto said membrane. It is therefore possible to compensate for the phase-shifts at the origin of the wave front deformation.

The actuators may notably be of the electromagnetic type, and then comprise movable members of the permanent-magnet type, which are fixed to the membrane and remotely control by fixed coils integral with the support.

Although they provide undeniable advantages, the known deformable mirrors may however have some drawbacks, which notably result from the assembling of the movable members of the actuators to the membrane.

Indeed, such an assembling, which is generally performed by adhesive bonding, may locally affect the properties of the membrane, both in terms of rigidity, of resonance frequency, and in terms of state of surface, and hence reduce the mirror performance.

In order to limit the consequences of the actuator assembling on the whole quality of the mirror, it has been contemplated, in particular, to keep a relatively thick membrane.

However, the more the membrane is thick, the more it is rigid, so that such a solution generally limits the capacity of said membrane to be deformed. In such a case, it may thus be necessary to implement relatively heavy and bulky actuators.

Furthermore, a great thickness tends more particularly to limit the capacity of said membrane to be deformed in an essentially localized manner, insofar as it is difficult to control in a fine and clearly differentiated manner the deformation of several points of the reflecting face located in the immediate vicinity of each other. A thick membrane has thus a relatively limited spatial resolution.

Besides, it has also been contemplated to coat the whole hidden face of the membrane with a uniform layer of adhesive on which the movable members of the actuators adhere.

However, such a solution has the drawback that it increases the mass of the moving membrane and lowers the resonance frequency thereof, which forces to limit the control speed thereof, at the expense of the mirror reactivity.

Moreover, coating the whole membrane with a continuous layer of adhesive may create a kind of bimetallic element whose thermal behaviour may make the mirror subject to instability or to drift phenomena.

Besides, the inventors have noticed that, whatever the solution chosen, the mirrors obtained by the known manufacturing methods still had surface irregularities, the positioning of the actuators inducing an embossment of the reflecting surface. Moreover, such phenomenon, known as "footprint" or "print-through", may of course prove problematic when the mirror is intended to a high-precision application.

DISCLOSURE OF THE INVENTION

Accordingly, the objects assigned to the invention are to remedy the various above-specified drawbacks and to propose a new deformable mirror with improved quality, accuracy and state of surface.

Another object assigned to the invention is to propose a new deformable mirror with a relatively simple structure.

Another object assigned to the invention is to propose a new deformable mirror that is simpler and cheaper to manufacture and assemble than the known deformable mirrors.

Another object assigned to the invention is to propose a new deformable mirror with a particularly homogeneous, reproducible, precise and stable behaviour.

Another object assigned to the invention is to propose a new deformable mirror that is particularly robust and that has a good longevity.

Another object assigned to the invention is to propose a new deformable mirror that tolerates a particularly fast control and that has a good reactivity.

Another object assigned to the invention is to propose a deformable mirror, in particular of the micro-mirror type, whose moving member, and in particular the membrane, are particularly light weight.

Another object assigned to the invention is to propose a new method for manufacturing a deformable mirror, which is particularly simple to implement and which makes it possible to obtain a mirror with an optimized quality, having in particular an excellent state of surface.

Another object assigned to the invention is to propose a new method for manufacturing a deformable mirror by adhesive bonding, which is relatively simple and fast to implement and which minimises the quantity of adhesive used.

The objects assigned to the invention are achieved by means of a deformable mirror comprising a deformable membrane having a reflecting face, said membrane being mounted on a support provided with at least one actuator adapted to deform said membrane, said actuator comprising at least one movable member fixed to the membrane by an adhesive joint, said mirror being characterized in that said movable member has a main body, located outside the adhesive joint, which is continued by an active part that penetrates entirely or in part into said adhesive joint, in such a way that the adhesive adheres at least in part to the side wall of said active part to ensure a junction between the movable member and the membrane, and in that said active part has a cross-section, delimited by said side wall, which is different from that of the main body.

The objects assigned to the invention are also achieved by means of a method for manufacturing a deformable mirror comprising a deformable membrane having a reflecting face, wherein a movable member of an actuator, adapted to locally deform said membrane, is adhesively fixed to said membrane, said method being characterized in that it comprises a step (a) of profiling a movable member of an actuator, wherein, at the end of the main body of an actuator movable member, is made an active part whose cross-section, delimited by the side wall thereof, is different from that of the main body, and a step (b) of assembling, wherein the movable member is adhesively fixed to the membrane, through the making of an adhesive joint connecting said membrane to at least one part of the side wall of said active part.

BRIEF DESCRIPTION OF THE DRAWINGS

Other objects, characteristics and advantages of the invention will appear more fully from the following description, with reference to the appended drawings, given only by way of illustrative and non-limitative examples, and in which:

FIG. 1 is a cut-away perspective view of a first embodiment of a deformable mirror according to the invention.

FIGS. 2 and 3 are partial cross-sectional side views of second and third embodiments of deformable mirrors according to the invention.

FIG. 4 is a schematic cross-sectional side view of an adhesive junction between movable members and a membrane within a mirror according to the invention.

BEST WAY TO IMPLEMENT THE INVENTION

Figures 5A, 5B, 5C, 5D, 5E:
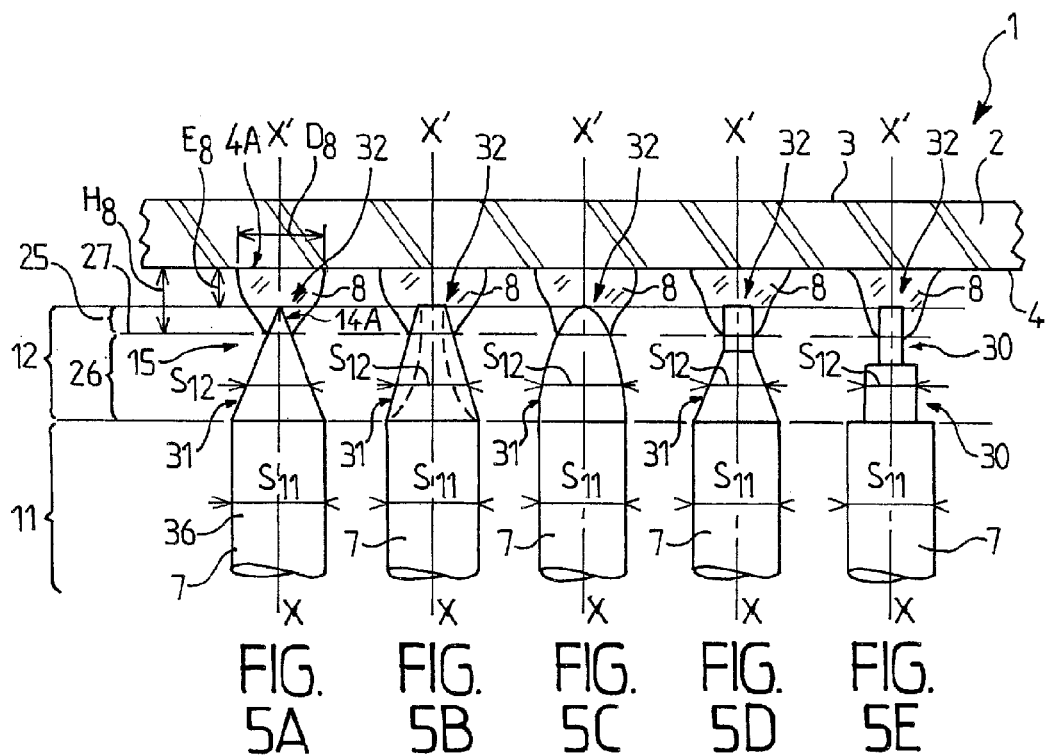
FIGS. 5A, 5B, 5C, 5D and 5E are partial cross-sectional side views of various embodiments of active parts on movable members of actuators according to the invention.

The present invention relates to a deformable mirror 1, and more particularly to a deformable mirror 1 intended to modify, and in particular to redress, a wave front in some optical application or other, for example in the field of astronomy, medicine, and more particularly ophthalmology, telecommunications, metrology, etc.

For that purpose, the deformable mirror 1 comprises a deformable membrane 2 that has a reflecting face 3 intended to reflect the incident light beam, as well as an opposite face, referred to the "hidden face" 4.

The membrane 2 is mounted on a support 5, preferably rigid, which may form a hollow housing covered by said membrane 2, as illustrated in FIG. 1.

Of course, the material constituting the membrane 2, as well as the thickness $e_2$ of the latter, will be chosen in particular to provide said membrane 2 with the required flexibility, while respecting the constraints linked to the resonant frequency threshold.

As such, said membrane may be made in a polymer film or by a thin silicon sheet, and may have a thickness lower than or equal to 50 μm, preferably lower than or equal to 10 μm, or even substantially comprised between 3 μm and 5 μm.

Preferably, the thickness $e_2$ of said membrane is substantially constant, so that the reflecting face 3 and the hidden face 4 are substantially parallel.

Likewise, the reflecting face 3 and/or the hidden face 4 may preferably be substantially regular and smooth, without any embossment or asperity, which makes it possible, in particular, to simplify the making of the membrane 2.

Of course, the ideal mean profile $P_0$ of said membrane 2, and more particularly of the reflecting face 3, may be any profile.

By way of example, said mean profile $P_0$, considered preferably in the rest state in the sagittal plane π of the deformable mirror 1, way be substantially rectilinear, in such a way that the reflecting face will be substantially planar, as shown in FIGS. 2, 3 and 4.

Said mean profile $P_0$ may also be slightly, and preferably regularly, curved, in such a way that the reflecting face 3 has a bulged, preferably concave, profile, and forms for example a kind of cup such as a spherical cap, as illustrated in FIG. 1, or a parabolic cap.

In the figures, the central optical axis of the mirror 1, which preferably constitutes the axis of revolution thereof, extends substantially parallel to the vertical direction.

Besides, the outline laterally delimiting the membrane 2 as well as the support 5 may be of any shape, but will preferably correspond to a regular polygon or a circle, the mirror being then substantially in the shape of a cylinder, or even a disk, as illustrated in FIG. 1.

According to the invention, the support 5 is provided with at least one actuator 6 adapted to deform said membrane 2, said actuator comprising for that purpose at least one movable member 7 fixed to the membrane 2 by an adhesive joint 8.

Preferably, the mirror 1 comprises a plurality of actuators 6, preferably substantially identical in structure and size, and consequently a plurality of movable members 7 independent from each other and all connected to the deformable member 2.

In a particularly preferential way, the actuators are distributed, inside the lateral outline of the membrane, and more particularly accommodated in the housing delimited by the support, according to the nodes of a network with regular meshes, for example substantially square or hexagonal in shape, in such a way that said actuators 6, and more particularly the associated movable members 7, square out the membrane 2, thus dividing it into a matrix, in which the displacement of each cell can advantageously be controlled individually.

By way of example, a mirror with a membrane 2 having a diameter of about 15 mm may comprise fifty-two actuators 6.

Preferably, as illustrated in the figures, the movable members 7 are arranged so as to be displaced, and to locally drive the membrane 2 into displacement, substantially in translation, in a direction that is substantially perpendicular to the mean profile $P_0$ of the reflecting face, and more particularly from the bottom to the top and the reverse, in a substantially vertical direction in FIGS. 1 to 3 and 5A to 5F.

According to an embodiment that is not shown, several adhesive joints 8, or even all the adhesive joints 8, can be connected to each other in such a way to form a substantially continuous and homogeneous layer covering widely, or even totally, the hidden face 4 of the membrane 2.

However, in a particularly preferential way, the movable members 7 will be connected to the deformable membrane 2 by a plurality of adhesive joints 8, respectively, which are separated from each other.

Advantageously, each of said movable members 7 may thus be fixed individually by means of a single isolated drop of adhesive, of low volume, which makes it possible not only to limit the quantity of adhesive required for the assembling, but also to gain in assembling accuracy, lightness of the thus-made unit, and to improve the state of surface, as will be described hereinafter.

Moreover, making individual and substantially punctual junctions 15 between the movable members 7 and the membrane 2 makes it possible, if needed, to separate a movable member 7 from said membrane without damaging the latter, in order for example to easily replace one or several defective movable members 7, which is tricky, or even impossible, in the case when a particularly strong connection is made by means of a continuous layer of adhesive.

Further, it is to be noticed that minimizing the quantity of adhesive advantageously makes is possible to considerably limit the degassing effects that might be observed when the mirror is used in a low-pressure application, and in particular "under vacuum", for example within a cryostat.

Of course, properties of the adhesive, and in particular the stiffness, viscosity, curing time, thermal behaviour thereof, etc., will be adapted to the intended application. As such, the adhesive joint 8 will preferably be made by means of an elastomer adhesive, for example of the silicone type.

Moreover, as illustrated in the figures, the adhesive joint 18 will preferably form a direct joint between the actuator 6 and the membrane 2, and more particularly between the movable member 7 and the hidden face 4, by spontaneously and substantially wetting these two elements.

Besides, it is to be noticed that the invention is not limited in any way to a particular type of actuator 6, and may notably implement, to cause and control the displacement of the movable member 7, and thus the moving of the membrane 2 away from or closer to the bottom 5A of the support 5, any type of technology capable of creating a movement, a deformation or an expansion, for example of mechanical, electric, electromagnetic, piezoelectric, pneumatic, hydraulic, thermal origin, etc.

As such, the actuator 6 may for example comprise a fixed member 9, integral with the support 5, and preferably inserted in a housing provided for that purpose in the bottom 5A of said support 5, in such a way to form a member for propelling the movable member 7, the latter being distinct from said fixed member 9 and mounted free to move with respect to the latter.

Therefore, according to the first embodiment illustrated in FIG. 1, the fixed member 9 may be formed by an electromagnetic inductor of the coil type, whereas the movable member 7 will be formed by a ferromagnetic movable core capable of moving along the generator axis of said solenoid.

According to the second embodiment illustrated in FIG. 2, the fixed member 9 may be formed by an electromagnet for controlling the intensity and the polarity of the magnetic field applied to the movable member 7, which is itself consisted of a ferromagnetic material or provided at the base thereof with a permanent magnet 10 being for example in the form of a pellet.

Of course, it is perfectly conceivable that the movable member 7 constitutes the rod of a cylinder, of the pneumatic, hydraulic, or screw type, etc.

Conversely, according to a third embodiment illustrated in FIG. 3, the actuator 6 may be formed by a column of adjustable height connecting directly the bottom 5A of the support 5 to the membrane 2, in the same way as a spacer.

Said column can advantageously comprise at least one section made in a piezoelectric material, or be entirely formed in a piezoelectric bar, in such a way that its height, and thus the distance separating the membrane 2 from the bottom 5A, can be modified and controlled, by causing the intrinsic longitudinal expansion, or alternately contraction, of said piezoelectric material.

According to an important characteristic of the invention, the movable member 7 has a main body 11, located outside the adhesive joint 8, said main body 11 being continued by an active part 12 that penetrates entirely or in part into said adhesive joint 8, in such a way that the adhesive adheres to the side wall 14 of said active part 12 to ensure a junction 15 between the movable member 7 and the member 2.

As used herein, "side wall" 14 designates the outer wall element that laterally delimits the active part 12, extending from the main body 11 to the free end 12A of said active part 12 that is the farthest from said main body, said free end being located in the adhesive joint 8, near the membrane 2.

In other words, the movable member 7, and more particularly the active part 12, extends preferably substantially along a mean line (XX') that connects the main body 11 to the free end 12A of the active part 12, said mean line substantially corresponding to the general direction according to which said active part 12 approaches the membrane 2 and penetrates into the adhesive joint 8, whereas the lateral wall 14 corresponds to the surface that coils up and closes around said mean line (XX') in order to mark the transverse limit of the active part 12 with respect to said mean line (XX').

Advantageously, the wetting by the adhesive of at least one part of the side wall 14 optimizes the surface area and the distribution of said adhesive over the active part 12, which ensures a good adherence and thus makes it possible to strengthen the fastening of the movable member 7 to the membrane 2.

In particular, such an arrangement makes it possible not to limit the junction 15 to a simple abutting joint, in which the adhesive joint 8 would form a film confined, without overflowing, in a space comprised between the hidden face 4 of the membrane 2 and the single upper wall delimiting the free end 12A of the active part.

As will be explained in detail hereinafter, it is possible to make a particularly robust and reliable junction 15, including and above all when the surface area of the upper wall of the active part 12, which is located opposite the membrane 2, is particularly limited, or even substantially punctual and nil.

Preferably, the mean line (XX') may be substantially parallel to the optical axis of the mirror 1, and more particularly substantially perpendicular to the membrane 2, as illustrated in the figures.

Furthermore, the movable member 7, and more particularly the main body 11 thereof, is preferably formed by a rod, which is preferably substantially in the form of a cylinder, preferably of circular base, and which extends preferentially substantially rectilinearly along said mean line (XX'), referred to the "generator axis".

Advantageously, the adhesive joint 8, on the one hand, adheres to, and spreads over, the hidden face 4 substantially parallel to the reflecting face 3, and on the other hand, adheres (at least) to the side wall 14 of the movable member, which extends along a direction substantially transverse, or even normal, to said hidden face 4.

It is therefore possible to connect the movable member 7 and the membrane 2 by depositing an adhesive joint (in the form of a layer or even a simple point) between, on the one hand, the active part 12 of the movable member 7, and on the other hand, the hidden face 4 of the membrane 2, which is transverse, or even substantially perpendicular, to the generator axis (XX') of said movable member, along which the latter drives the membrane into displacement.

The inventors have indeed noticed that it was possible to obtain a junction 15 that is both simple and robust enough and with a low bonding footprint, by wetting jointly, even freely, by means of a same adhesive joint 8, at least two bonding surfaces 4A, 14A, including a first specially-profiled adhesive-coating surface 14A belonging to the side wall 14 of the active part 12 of the movable member 7, making it possible to control, and more particularly to limit, the degree of wetting, as will be described in detail hereinafter, and a second adhesive-coating surface 4A that forms a portion of the hidden face 4 and that is approached transversally, and in particular substantially perpendicularly, by the movable member 7, wherein said second adhesive-coating surface 4A can advantageously appear substantially "flat", smooth and regular, opposite the tip of said movable member and substantially normal to the generator axis (XX') of the latter, without the bonding performance being weakened or reduced.

Preferably, the movable member 7, and more particularly the rod, is made single-piece in a material that is rigid, and notably sufficiently rigid in comparison with the efforts to be provided to deform the membrane 2 along a sufficient functional stroke, which is vertical in the figures.

Each actuator 6 may thus be advantageously provided with a single monolithic movable member 7.

Furthermore, said material, and more generally the movable member 7, should be lightweight and easily machinable, for a low cost.

By way of example, such a rod may be made from a carbon fibre/epoxy matrix type composite, glass fibre or metallic material bar.

According to another important characteristic of the invention, the active part 12 has a cross-section $S_{12}$, delimited by the side wall 14, which is different from the cross-section $S_{11}$ of the main body 11.

As used herein, "cross-section" designates the section of the movable member 7, and more particularly the section of the active part 12, respectively of the main body 11, which is considered transversally to the mean line of extension of said movable member 7, said mean line going from the main body to the end of the active part 12.

When the movable member is formed by a rod of generator axis (XX'), the cross-sections correspond to the planar sections measured substantially perpendicularly to this generator axis, wherein the latter moreover preferably substantially corresponds to the general direction according to which the movable member 7 approaches the membrane 2, penetrates into the adhesive joint, and is liable to be displaced.

In a particularly advantageous manner, the differentiated arrangement of the movable member 7 according to the invention makes it possible to significantly improve the state of surface of the reflecting face 3, in such a way that the real surface of said reflecting face 3 is substantially close to the ideal mean profile $P_0$ that is desired—at least in theory—for the latter.

Indeed, the inventors have noticed that, by making mirrors by means of known movable members, a non-negligible embossment of the reflecting face 3 was generated, due to the fact that each movable member 7 imprinted a print-through at said reflecting face, but that it was possible to mitigate this phenomenon by providing said movable members, and more particularly the active part thereof, with a specifically-studied shape.

More particularly, the inventors have noticed that, during the wetting of the end of a movable member 7 by the adhesive, the latter had a tendency to go up along said member by capillarity, forming a meniscus that had for effect to generate stresses between said movable member 7 and the hidden face 4 on which the adhesive is placed.

Moreover, these stresses may be at the origin of a phenomenon of contraction, or shrinkage, which causes the local bending of the membrane 2, the latter tending to narrowing around the end of the movable member 7 that is embedded in the adhesive.

The assembling of the known mobile members to the membrane had thus for effect, until now, to locally curve said member, imprinting therein a bump 20, substantially just above each movable member.

Conversely, as illustrated in FIG. 4, the specific arrangement of the mirror 1 and the movable member 7 according to the invention, and more particularly the particular profile of the active part 12, advantageously makes it possible to limit the print-through induced by the junction 15 in the reflecting face 3 of the mirror 1, and more particularly to mitigate said print-through effect by reducing the amplitude of the possible bumps 20 that deteriorate the quality of the state of surface of the membrane 2, and more particularly of the reflecting face 3.

More particularly, it has been noticed that the possible residual print-through resulting from the assembling according to the invention is far smaller than that leaved by a movable member whose cross-section would be relatively wide and invariant from the main body 11 to the end steeping in the adhesive.

Advantageously, the invention thus makes it possible to finely control the wetting of the movable member 7, and more particularly of the active part 12, so as not to generate significant asperities on the reflecting face 3.

Furthermore, such an arrangement differentiating the main body 11 from the active part 12 by their geometry and their size makes it possible, while substantially preserving the reflecting face 3 from the print-through phenomenon, to keep a reinforced main body 11, with a relatively important size, and notably the cross-section, having consequently an excellent rigidity and more particularly a good stiffness in tension and compression.

By way of example, the main body can notably have a diameter greater than or equal to 200 µm, and preferably substantially comprised between 200 µm and 400 µm.

A more reliable, fast and reproducible transmission of movement can thus be obtained between the fixed member 9, and more particularly the support 5, and the membrane 2 connected to the mobile member 7.

The mirror 1 can thus gain in reliability and rapidity, without suffering from instability or from dynamic control error.

In the following, for convenience of description, "immersed portion" 25 will designate the portion of the mobile member 7, and more particularly of the active portion 12, which is embedded in the adhesive joint 8, and "emerging portion" 26 will designate the portion of the mobile member 7, and more particular, when the case arises, of the active part 12, which it located outside the adhesive joint 8, substantially opposite the membrane 2, and which preferably steeps in the atmosphere that is confined inside the housing delimited by the support 5 and the membrane 2.

Figure 6:
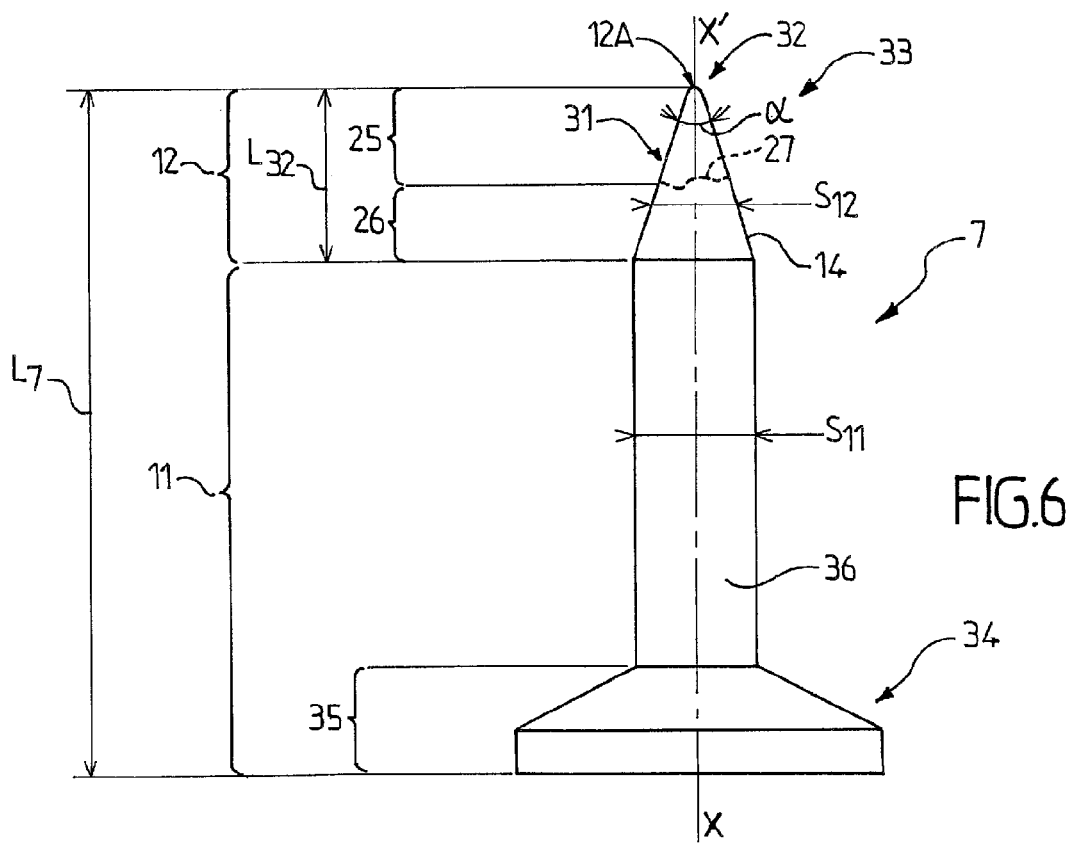
FIG. 6 is a side view of an embodiment of a movable member of an actuator according to the invention.

In practice, this is therefore the adhesive-atmosphere interface 27 that forms the separation between said emerging portion 26 and the immersed portion 25 of the active part 12, such separation being materialized on the side face 14 by a wetting line shown in dotted line in FIGS. 4 and 6.

In a possible embodiment, the cross-section change between the main body 11 and the active part 12 may take place at least in part, if not in totality, in the emerging portion 26 of the movable member 7, i.e. outside the adhesive joint 8, as it is the case for example in FIGS. 5D, 5E. In other words, the cross-section variation affecting the active part 12 may be located outside the adhesive joint.

The cross-section $S_{12}$ of the active part 12, although being modified with respect to that of the main body 11, may then continue in a substantially constant way from the emerging portion 26 to the immersed portion 25 included, as it is the case in FIGS. 5D, 5E.

However, according to another preferential embodiment, corresponding for example to FIGS. 5A, 5B, 5C, the immersed portion 25 of the active part 12, embedded in the adhesive joint 8, shows at least one size variation of its cross-section $S_{12}$.

In other words, the active part 12 shows preferably at least one variation, or even several successive variations, of its cross-section $S_{12}$, and more particularly of the surface area thereof, along its immersed portion 25, i.e. in the space comprised between the adhesive-atmosphere interface 27 and the free end of said active part 12 located in the vicinity of, or substantially against, the hidden face 4.

Of course, the nature of the size variation of the cross-section $S_{12}$ of the active part 12 is not limited in any way, and may notably consist in a narrowing, i.e. a reduction of the distance from all or part of the points forming the outline of the side wall 14 to the generator axis (XX'), or on the contrary in a widening, and more particularly an increase of the distance from said side wall 14 to the generator axis (XX').

It is also perfectly conceivable that the active part 12 shows several successive variations of its cross-section $S_{12}$, substantially stepped along said generator axis (XX').

Therefore, according to an embodiment that is not shown, the side wall 14 may form a protruding flange and/or, on the contrary, a substantially ring-shaped recessed groove, either one being preferably intended to be covered by adhesive joint 8.

Besides, it is conceivable that the variation(s) of the cross-section $S_{12}$ of the active part 12 is(are) formed by one or several steep steps 30, of the shoulder type, as illustrated in particular in FIG. 5E.

However, the active part 12 will preferably have a transition length 31, along which the cross-section $S_{12}$ thereof varies progressively.

Advantageously, a progressive variation of section, substantially continuous and smooth, that extends longitudinally over a non-punctual distance along said generator axis (XX'), may therefore be obtained, notably by curving and/or inclining the side wall 14 of the active part 12, with respect to the side wall of the main body 11 and/or with respect to the generator axis (XX').

Preferably, said transition length 31 will extend over the majority, or even over the whole length of the active part 12, as illustrated notably in FIGS. 5A, 5B and 5C, wherein said transition length 31 can be unique and monotonous, i.e. exclusively dedicated to the narrowing or on the contrary to the widening of the cross-section $S_{12}$.

Preferably, as illustrated in FIGS. 5A, 5B and 5C, the transition length 31 extends on either side of the adhesive-atmosphere interface 27, i.e. the variation of the cross-section $S_{12}$ started in the emerging portion 26 is advantageously continued to the immersed portion 25 and through the latter, the transition length 31 being distributed over both the emerging portion 26 and the immersed portion 25.

Of course, such arrangement will depend on the geometry and size characteristics of the movable member 7, and more particularly on the profile of the active part 12, as well as on the quantity of adhesive used to form the adhesive joint 8 as well as on the degree of embedment, i.e. of penetration, of the active part 12 in said adhesive joint.

Particularly preferentially, the cross-section $S_{12}$ of the active part 12 varies so as to show at least one narrowing, as shown in all the figures.

More particularly, according to a preferential embodiment that may constitute an invention as such, the active part 12 may progressively taper in such a way to form a tip 32 at the first end 33 of the mobile member 7.

In other words, the active part 12 has preferably a terminal narrowing, in such a way that the end of the mobile member 7 keeps tapering, the cross-section thereof generally decreasing, in particular with respect to the cross-section $S_{11}$ of the main body that precede it.

Therefore, the side wall 14 preferably tends to fold down progressively and to converge towards the generator axis (XX'), in the direction of penetration of the active part 12 into the adhesive joint 8, in such a way that said active part 12 may constitute a profiled tip of penetration and wetting, whose cross-section $S_{12}$ reduces as it get closer to the hidden face 4, and whose shape may notably remind that of a wedge.

Such convergence, substantially total or truncated, is preferably made by means of a substantially continuous profile, forming a transition length 31 as described hereinabove, wherein said substantially continuous profile can notably be rectilinear, as illustrated in full line in FIGS. 5A, 5B, or on the contrary curved, and notably convex, i.e. outwardly bulged, as illustrated in FIG. 5C, or concave, as illustrated in dotted line in FIG. 5B.

More particularly, the tip 32 may be substantially conical, as illustrated in FIGS. 1, 5A and 6, substantially frustoconical, as illustrated in FIGS. 2, 3, 4 and 5B, rounded as a dome, in particular a substantially parabolic dome, as illustrated in FIG. 5C, ogival, or hyperboloidal, as illustrated in dotted line in FIG. 5B.

In order to simplify the machining of the particularly fine active parts, while preserving the solidity of these latter, the frustoconical or dome-shape tips will preferably be favoured.

Furthermore, the free end 12A of the tip 32 may advantageously be blunt, flattened or rounded, for example by polishing.

Besides, the convergence of the tip may also be obtained discretely, by means of one or several shoulders 30, preferably substantially concentric to each other and arranged in steps, so as to form a tip of the half-dog type, whose outline may for example be substantially inscribed in a substantially frustoconical or ogival fictive envelope.

Therefore, it is not excluded that the tip can have in particular the shape of a cylinder whose section is substantially constant and narrower than that of the main body 11, and preferentially comprise at least two successive concentric cylinders, aligned with decreasing diameter, each having a substantially constant diameter that is smaller than the diameter of the cylinder that precedes it, as illustrated in FIG. 5E.

Of course, the geometry of the tip 32 may result from the combination of one or several profiles, as described hereinabove.

It is to be noticed that the use of pointed movable members makes it possible to obtain, between each movable member 7 and the membrane 2, a quasi-punctual connection, because the junction 15, in particular when it uses only one isolated and little voluminous adhesive joint 8, occupies only a very low surface area of the hidden face.

By way of example, the surface of the membrane 2 occupied by the junction 15, and more particularly covered with the adhesive forming an isolated joint 8, may have a full cross-size $D_8$ strictly lower than 1 mm, and in particular lower than or equal to 600 µm.

Such a quasi-punctual assembly further makes possible for the movable members to almost not affect the properties and the behaviour of the membrane 2 at the junctions 15 and in the vicinity of these latter, and more particularly to substantially follow the profile $P_0$ at rest of said membrane, without modifying it, whether this profile is planar or curved.

Preferably, the tip 32 is unique, single-piece, and substantially centred on the generator axis (XX'), said tip 32, more generally the active part 12, and still more generally the whole movable member 7, having preferably a geometry of revolution around said generator axis (XX).

Besides, in a particularly preferential way, the tip 32 is (only) partially embedded in the adhesive joint 8.

In other words, the active part 12, and more particularly the tip 32, may be not fully embedded in the adhesive joint 8, in such a way that the adhesive-atmosphere interface 27 is located in an intermediate area of the tip 32, substantially comprised between the wide base of the tip, which is connected to the main body 11, and the tapered free end of said tip 32, which is directed towards the membrane 2.

Advantageously, such an arrangement makes it possible to limit, on the one hand, the size of the immersed portion 25, and more particularly, the diameter of the cross-section of the active part 12 in said immersed portion, while keeping, on the other hand, a whole surface area of the side wall 14 that is sufficient to ensure a good adherence of the adhesive joint to the movable member 7, and therefore a good fastening of said movable member 7 to the membrane 2.

Such an arrangement makes it possible in particular to limit the quantity of adhesive required for making the joint 8, and further, to control, and more particularly to limit, the going up of the adhesive along the active part 12, and therefore the formation and the spreading of a corresponding meniscus, which contributes to a significant reduction of the stresses exerted by the junction 15 on the membrane 2, and thus to the mitigation of the print-through effect.

In order to guarantee the emergence of a portion of the tip outside the adhesive, or by an independent constructive arrangement, it may be provided that the length $L_{32}$ of the tip 32, measured between the base and the free end thereof, and which preferably coincides with the length of the active part 12, is greater than or equal to the total height $H_8$ of the adhesive joint 8, or "wetting height", measured between the hidden face 4 and the adhesive-atmosphere interface 27.

Said total height $H_8$ of the adhesive joint 8 may in particular be substantially comprised between 100 µm and 300 µm, and more particularly close to 200 µm, whereas the length $L_{32}$ of the tip 32 may be substantially comprised between 300 µm and 500 µm, and in particular close to 400 µm.

Therefore, the adhesive will preferably wet the tip 32 substantially to half the height of the latter, and more particularly to half the height of the side wall 14 and of the transition length 31.

Therefore, the junction can have a substantially biconical structure, whose shape reminds that of a hourglass, and comprising a upper, flexible cone, formed by the adhesive joint 8, whose wide base adheres to the hidden face 4, which is connected to a lower, rigid cone, formed by the tip 32 that substantially penetrates into said upper cone through the apex of the latter.

Preferably, the adhesive joint(s) 8 will be (each) formed by a drop of adhesive, whose wide base adheres to the hidden face 4 substantially parallel to the reflecting face 3, and into the apex of which the tip 32 penetrates.

Besides, once the movable member 7 is assembled, the free end 12A of the active part, hence of the tip 32, will advantageously be set back from the hidden face 4, for example at a distance of about 20 µm to 40 µm from the latter.

Therefore, the residual thickness $R_8$ of the adhesive joint, comprised between the active part 12, and more particularly the free end 12A thereof, and the membrane 2, and separating these latter, will preferably be lower than or equal to 50 µm, and in a particularly preferential way, substantially comprised between 20 µm and 30 µm.

Besides, the apex angle α of the tip 32, and when the case arises of the fictive envelope in which said tip 32 is substantially inscribed, will preferably be substantially comprised between 15 degrees and 45 degrees, and preferably substantially close to 20 degrees to 30 degrees, or even to 40 degrees.

In a particularly preferential way, the quadratic roughness Rq of the reflecting face 3, after adhesive junction of the membrane 2 with the movable member(s) 7, may then be lower than or equal to 7 nm (nanometers), or lower than or equal to 6 nm, preferably lower than or equal to 5 nm, preferentially lower than or equal to 4 nm, or even lower than or equal to 3 nm.

As used herein, "quadratic roughness Rq", also called "RMS roughness" for "Root Means Square Roughness", designates the roughness measurement performed according to the standard ISO 4287 and that corresponds to the following formula:

$$Rq = \sqrt{\frac{1}{L} \cdot \int_0^L Z^2(y) \cdot dy}$$

where L represents the profile basis length on which the measurement is performed, along the direction y, and Z(y) corresponds to the ordinate of the roughness profiles, with respect to the theoretical mean profile $P_0$ considered along said basis length.

According to a preferential embodiment, the above-mentioned roughness values may be reached over a basis length of the order of at least 15 mm, which preferably corresponds to the total diameter of the membrane 2.

By way of comparison, the best quadratic roughness values obtained up to now for planar mirrors with the known methods were of the order of more than 7 nm to 10 nm, i.e. values that are more than two to three times higher.

The quality, the resolution and the accuracy of said mirror 1 according to the invention are thus greatly improved, the "row" state of surface of the reflecting face 3 of the mirror 1 according to the invention being almost not further disturbed by the movable member assembling operation.

Furthermore, the inventor have noticed that the roughness values reached up to now by the known mirrors and considered as reflecting the best accessible result were very rapidly deteriorating (i.e. increasing) when it was tried, within said known mirrors, to provide the membrane 2 with a wholly bulged profile, in particular a parabolic profile.

Such degradation is explained in particular by the fact that the movable members, and more particularly the magnetized disks, used in the prior art devices, have, opposite the membrane, a relatively extended contact surface, whose diameter is close to 1 mm, and whose stiffness is very higher than the intrinsic stiffness of said membrane 2.

Consequently, as the areas bonded to the rigid disks are incapable of bending, when it is tried to curve the membrane to give it a bulged profile, it can be observed a real segmentation of said membrane, and thus of the reflecting face, the latter tending to split up into a succession of relatively wide facets, substantially planar and inclined relative to each other along broken lines, instead of keeping a regular curvature.

Conversely, in the mirror according to the invention, it is possible to make a quasi-punctual connection between each movable member 7 and the membrane 2, in particular by means of a very fine tip 32 capped with a low-diameter droplet of adhesive, which makes possible for the actuators to substantially conform the membrane profile $P_0$, whatever the latter is, without interfering with it, nor in particular tending to locally "redress" it (except for which regard the controlled voluntary deformations, required for correcting the wave front).

Therefore, the occurrence of flats on the deformation of the membrane 2 can then be in particular substantially avoided.

Advantageously, the performance and the state of surface of the mirror 1 according to the invention are thus relatively little sensitive to a non-planar shaping of the membrane 2, in particular when the latter is given a bulged theoretical mean profile $P_0$, for example regular and concave, and in particular spherical or parabolic.

Besides, the membrane 2 substantially keeping its flexibility in any point, and in particular just above and in the immediate vicinity of the junctions 15, it is possible to deform locally said membrane 2, with respect to its nominal profile at rest and in the limit of its intrinsic flexibility, in a particularly fine, precise and spatially differentiated manner, which improves the spatial resolution of the mirror 1.

Of course, the invention may as such relates to a deformable mirror having at least one movable member 7 adhesively fixed to the membrane 2 and whose adhesive joint 8 and movable member 7 are chosen and arranged relative to each other in such a way that the quadratic roughness of the reflecting face 3 corresponds to the above-mentioned values.

Besides, according to a preferential characteristic that may constitute a full invention, the movable member 7 has at its second end 34, opposed to the active part 12, a widen footing 35, as illustrated in particular in FIGS. 2, 3 and 6.

Preferably, said widen footing 35 is connected to the tip 32 forming the active part 12 by a stem 36.

Advantageously, as it is in particular the case in the third embodiment illustrated in FIG. 3, the footing 35 may advantageously provide a pedestal for the movable member 7 to directly rest in contact against the support 5, taking advantage of a good seat due to the fact that the footing 35 forms a wide-extent sole having an excellent flatness, preferably substantially normal to the generator axis (XX').

According to the second embodiment illustrated in FIG. 2, said footing 35 provides an important bonding surface making it possible to hitch, and more particularly to hang, a permanent magnet 10 to the membrane 2, preferably in free hanging, remote from the hidden face and from the bottom 5A, through the movable member 7 that then forms a spacer.

Advantageously, such a spacer makes it possible to push aside the magnet so as to set it back from the membrane 2, and more particularly from the junction 15, and thus to minimize the extent of the rigid elements placed at the immediate vicinity of said membrane. A connection can then be made, which remains essentially flexible, at the immediate vicinity of said membrane.

More particularly, a substantially punctual contact can thus be kept between the movable member 7 and the membrane 2, while using an actuator 6, and more particularly a magnet 10, of relatively great size, far greater than that of the junction 15, and thus strong but also easy to handle and to assemble.

Moreover, when the magnet 10 is formed of a disk, the diameter of the footing 35 may advantageously be chosen substantially equal to that of said disk, which significantly facilitates the relative centring of the magnet with respect to the movable member 7 and more particularly to the tip 32, in particular if it is required to add said magnet 10 so as to fix it against said footing 35, for example bonded under the latter.

According to a preferential characteristic that may constitute a full invention, whatever besides the arrangement of the mirror, of the movable member 7 and the nature or the arrangement of the connection between said movable member 7 and the membrane 2, the footing 35, or even the movable member 7 taken as a whole, may be ferromagnetic.

According to an embodiment, such a ferromagnetic footing 35 may advantageously be passively drawn by the permanent magnet 10, in such a way that the holding of said magnet 10 on said footing 35 is essentially, or even exclusively, ensured by magnetic adherence.

The footing 35 may be made in a bulky ferromagnetic material, or may carry a ferromagnetic material, for example in the form of a coating partially or fully covering the footing 35 and/or the rod of the main body 11, wherein said coating can in particular be made through over-moulding, or through lithography and metal deposition.

Advantageously, the magnetic attraction force exerted by the magnet 10 on the footing 35 when said magnet is located the nearest from the receiving surface of said footing, and preferably in direct contact with the latter, may be chosen so as to have a higher value than that of the maximal tensile effort liable to be exerted by the actuator 6 on the membrane 2, in such a way that it is not necessary to consolidate the footing/magnet connection by third means, and more particularly in such a way that it is not necessary to use a bonding to combine these two elements.

As such, an appropriate wide-enough surface area may in particular be defined for the transverse contact surfaces of the magnet and of the footing that come opposite to each other.

Therefore, it is conceivable to significantly simplify the structure and the assembly of the actuators 6, and more particularly of their movable parts, because it is just needed to add the permanent magnets 10 by simply putting them against the respective footing 35 thereof, to spontaneously obtain the fixation thereof by simple magnetic attraction.

Furthermore, due to the magnetic attraction, and when the case arises by suitably dimensioning the footing 35 and the magnet 10, in particular by providing these latter with equal or at least substantially corresponding shapes and sizes, an automatic centring of said magnet with respect to said footing can also be obtained, which simplifies the assembling operation and makes it possible to directly obtain a well-balanced actuator.

Moreover, the reversibility of such an assembly allows if need be to easily and non-destructively remove the actuator 6, by separating the magnet 10 from its footing 35, for example when it is necessary to replace or rebalance a defective actuator or to correct an incorrect assembly. As such, the modular design according to the invention makes it possible, if need be, to replace only the defective part, while keeping most of the other elements in good state in order to reuse them in the mirror, which of course makes it possible to limit the rejection rate during the manufacturing or during the maintenance operations.

According to an alternative embodiment, and as already contemplated herein above, the movable member 7 may be formed directly single-piece, in a magnetized ferromagnetic material, advantageously capable of keeping a permanent magnetization, in such a way to form intrinsically, according to a preferential characteristic that may constitute an invention as such, a permanent magnet contributing to the actuation of the membrane 2.

In other words, the movable member 7 may be formed by a monolithic permanent magnet that is sharpen so as to have, on the one hand, a main body 11, and on the other hand, an active part 12, and more particularly a tip 32, according to either one of the above-mentioned arrangements.

Such a magnetized mobile member may be made by any suitable technique and, for example, by moulding or sintering.

Said permanent magnet may advantageously have, in row along the generator axis (XX'), several lengths of different cross-sections, formed continuously in the same ferromagnetic material, and preferably, as shown in FIG. 35, a lower terminal length forming a wide footing 35, possibly an intermediate length 36 forming a narrow cylindrical stem, whose diameter is smaller than that of said footing 35, which may act as a spacer for its spacing away from the membrane 2, and finally a upper terminal length forming a fixation tip 32 through which said magnet is hung to said membrane.

Whether the magnet is added on a rod or is integral with the movable member 7, the latter advantageously makes it possible to hang to the membrane 2, and more particularly to the hidden face 4, a permanent magnet 10 whose diameter is preferably substantially equal to that of the footing 35.

In all the cases, whatever the embodiment contemplated, the footing 35 makes it possible to improve the efficiency and the reliability of the actuator 6, and thus of the driving of the membrane 2.

Advantageously, a movable member comprising, preferably as a single piece, both a widen footing 35 and a tip 32, makes it possible to combine, on the one hand, stability and handiness during the assembling, and on the other hand, robust contact but with low interference with the membrane 2.

By way of indication, the diameter of the footing 35 may for example correspond to two to three times that of the stem 36.

For example, the full overall length of the movable member 7 may be substantially comprised between 1 mm and 3 mm, and preferably close to 1.5 mm, the diameter of the stem 36 may be comprised between 200 μm and 500 μm, and preferably close to 300 μm, and the diameter of the footing 35 may be comprised between 800 μm and 1 mm.

The height of the footing 35 way represent preferably less than 30%, preferably less than 25% and preferentially between 15% and 20% of the total length of the main body 11, the latter comprising the stem 36 and said footing 35.

Of course, the one skilled in the art will be capable of adapting the arrangement of the mirror 1, and more particularly of the movable member 7 and of the active part 12 thereof, as a function in particular of the size of the mirror 1 and of the membrane 2, as well as of the degree of accuracy required for the control, or of the desired state of surface.

As such, it is perfectly conceivable to consider either one of the above teachings, in isolation or in combination with each other, in particular regarding the implementation of a tip 32 at the end of the movable member 7, whatever the arrangement according to which said tip is introduced, totally or in part, into the adhesive joint 8.

Of course, the present invention also relates to a method for manufacturing a deformable mirror 1 as described hereinabove, wherein a movable member 7 adapted to locally deform said membrane 2 is adhesively fixed to the membrane.

According to a characteristic of the invention, said method comprises at least one step (a) of profiling a movable member 7 of an actuator, wherein, at the end 33 of the main body 11 of a movable member 7 of an actuator, is made an active part 12 whose cross-section $S_{12}$, delimited by the side wall 14 thereof, is different from the cross-section $S_{11}$ of the main body 11, and a step (b) of assembling, wherein the movable member 7 is adhesively fixed to the membrane 2, through the making of an adhesive joint 8 connecting said membrane 2 to at least one part of the side wall 14 of the active part 12.

Of course, it is conceivable to implement any type of method adapted for profiling the movable member 7, and in particular any method of moulding, drawing, polishing, machining, cutting, etc.

Of course, this profiling is made so as to reduce the print-through induced by the junction 15, and more particularly the movable member 7, on the reflecting face 3 during the bonding, and may correspond to varied shaped, which can be determined for example by simulation or empirically.

Preferably, the step (a) of profiling will result in the formation of a tip 32 tapering the first end 33 of the movable member 7.

More particularly, according to a characteristic that may constitute a full invention, independently of the presence or the absence of an active part 12 according to the invention, the step (b) of assembling may comprise a sub-step (b1) of transfer adhesive-coating, wherein the end 33 of the movable member 7 is placed in contact with an adhesive resist, and more particularly wherein the profiled active part 12 is brought into contact with a substantially liquid adhesive bulk, or the tip 32 is slightly dipped into said mass of adhesive, in order to take by capillarity a drop of adhesive wetting said end, and a sub-step (b2) of junction, wherein the thus-adhesive-coated end of the movable member 7 is applied against the hidden face 4 of the membrane 2.

Advantageously, such a method makes it possible to limit the quantity of adhesive taken and applied against the membrane 2 to a minimal quantity just necessary and sufficient to ensure the suitable fixation of the movable member 7 to the membrane 2, and thus to limit the print-through phenomenon.

Moreover, such a method makes it possible to guarantee a particularly precise and regular approach of the movable members 7 when these latter have to come alongside the membrane 2.

As such, although it is conceivable that the sub-steps b(1) of adhesive-coating and/or (b2) of junction may be operated individually, one movable member at a time, they will be particularly preferentially carried out collectively, wherein a plurality, if not the totality, of the movable members of the mirror are handled, adhesive-coated and applied to the back of the membrane in a simultaneous manner, by partial batch or preferably by entire group of movable members, by means of a suitable gripping member making it possible to place and hold them during each of said operations according to the network arrangement chosen.

Advantageously, the mass of adhesive in contact with which the sub-step (b1) of transfer adhesive-coating is performed may then be in the form of a strip having an adhesive coating on one of its faces, whose size is greater than or equal to that of the surface area occupied by the movable members 7, and preferably substantially planar, against which the protruding tips of all said movable members are applied simultaneously, and preferably according to movement of approach substantially normal to said face, said movable members being themselves held laterally relative to each other, substantially in their definitive configuration, by a suitable support.

Of course, the method, which will preferably apply to a planar membrane, may comprise a step (c) of deforming the membrane, wherein said membrane 2 is given a non-planar mean profile $P_0$, for example a parabolic or spherical profile.

Advantageously, both during the sub-step (b1) of transfer adhesive-coating and during the sub-step (b2) of junction, the embedment of the movable member 7, and more particularly of the tip 32 forming the active part 12 thereof, is controlled, in such a way that the adhesive can go up partially along the side wall 14 of the active part 12, and more particularly along the transition length 31 of the tip 32, but that said adhesive remains substantially set back from the main body 11, and more particularly from the wide base of the tip 32.

In particular, during the sub-step (b2) of junction, when a compression effort is applied, which tends to bring the tip 32 closer to the hidden face 4, in such a way that the drop of adhesive taken adheres to and spread over said hidden face, advantageously freely, whereas it is substantially squeezed and pushed away by said tip 32, it is preferably made sure that at least a portion of said tip is maintain outside the adhesive joint.

As such, it is to be noticed that the progressive variation of the transition length 31 advantageously makes it possible to adjust the degree of embedment of the movable member 7 into the adhesive.

It can therefore be contemplated to finely adjust the position at rest of said member with respect to the membrane 2, as well as the effective surface area of adhesive-coating on the side wall 14, and thus the mechanical strength and the stiffness of the junction 15, and this in a progressive way while keeping, whatever the adjustment chosen, the benefit of the anti-print-through function provided by the specific profile of the active part 12.

Of course, the method will next comprise a step of polymerization or "drying", wherein the adhesive joint 8 is left to "cure".

Therefore, the present invention advantageously makes it possible to make, by means of a multi-purpose method that can be applied both to planar mirrors and to domed mirrors, a deformable mirror having an excellent finish, a high degree of precision, a good speed of execution during the dynamic modifications of the configuration of its membrane by the actuators 6, i.e. a low response time, as well as a good mechanical and thermal stability, and that while keeping a structure that is relatively simple, compact and relatively easy to assemble, modify or repair, which makes it possible when the case arises to increase the spatial density of the actuators and the spatial resolution of adjustment of the reflecting surface of the mirror.

INDUSTRIAL APPLICABILITY

The invention finds its industrial application in particular in the making of mirrors and adaptive optical systems.

The invention claimed is:

1. A deformable mirror comprising:
   a deformable membrane having a reflecting face and an opposite hidden face,
   said deformable membrane being mounted on a support provided with at least one actuator adapted to deform said deformable membrane,
   said at least one actuator comprising at least one monolithic movable member, each monolithic movable member of said at least one monolithic movable member fixed to the hidden face of the membrane by a quasi-punctual adhesive joint that includes a conical drop of flexible adhesive whose wide base adheres to and spreads over the hidden face substantially parallel to the reflecting face, the wide base formed by free spreading of the adhesive over the hidden face,
   wherein said at least one monolithic movable member has a main body, located outside the adhesive joint, which is continued by an active part, forming a tip at a first end of the moveable member, that penetrates entirely or in part into an apex of the conical drop of adhesive in such a way that the adhesive adheres at least in part to a side wall of said active part, and wherein said active part has a cross-section, delimited by said side wall, that is narrower than a cross-section of the main body.

2. A deformable mirror according to claim 1, wherein an immersed portion of the active part, embedded in the adhesive joint, has a cross section having at least one size variation.

3. A deformable mirror according to claim 1, wherein the active part has a transition length, along which a cross-section thereof varies progressively.

4. A deformable mirror according to claim 3, wherein the transition length extends on either side of an adhesive-atmosphere interface that forms a separation between an emerging portion and an immersed portion of the active part.

5. A deformable mirror according to claim 4, wherein a total height of the adhesive joint, measured between the hidden face and the adhesive-atmosphere interface, is within a range between 100 μm and 300 μm.

6. A deformable mirror according to claim 1, wherein the tip is substantially conical, frustoconical, rounded as a dome, or hyperboloidal.

7. A deformable mirror according to claim 6, wherein the tip is partially embedded in the adhesive joint.

8. A deformable minor according to claim 1, wherein the movable member has, at a second end opposed to the active part, a widened footing.

9. A deformable mirror according to claim 8, wherein the movable member hangs to the membrane a permanent magnet having a diameter which is substantially equal to a diameter of the widened footing.

10. A deformable mirror according to claim 8, wherein the widened footing is ferromagnetic.

11. A deformable mirror according to claim 1, wherein the movable member is formed by a rod that is fixed to the hidden face of the membrane opposed to the reflecting face, and that is made as a single-piece from a rigid material.

12. A deformable minor according to claim 1, wherein the movable member is formed by a monolithic permanent magnet that is sharpened.

13. A deformable mirror according to claim 1, comprising a plurality of movable members independent from each other and connected to the deformable membrane by a plurality of adhesive joins respectively, which are separated from each other.

14. A deformable mirror according to claim 1, wherein a quadratic roughness (Rq) of the reflecting face, beyond a junction of the membrane with the movable member is lower than 7 nm.

15. A deformable mirror according to claim 1, wherein the deformable membrane has a thickness ($e_2$) lower than or equal to 50 µm, whereas a thickness ($E_8$) of the adhesive joint separating the active part from the membrane is substantially lower than or equal to 50 µm.

16. A method for manufacturing a deformable mirror that includes a deformable membrane having a reflecting face and an opposite hidden face, the method comprising:

applying a conical drop of adhesive to the hidden face such that a wide base of the drop adheres to, freely spreads over and spontaneously wets the hidden face substantially parallel to the reflecting face; and inserting entirely or in part into an apex of the conical drop of adhesive an active part of a monolithic movable member of an actuator configured to locally deform the membrane, the active part forming a tip at an end of a main body of the movable member and having a cross-section, delimited by a side wall thereof, that is narrower than a cross-section of the main body such that the applied adhesive adheres to and spontaneously wets at least in part to a side wall of said active part as to form a quasi-punctual adhesive joint that connects the hidden face of said membrane to at least one part of the side wall of said active part.

17. A method according to claim 16, wherein the applying the drop of adhesive comprises transferring adhesive-coating, wherein an end of the movable member is placed in contact with an adhesive resist, in order to take by capillarity a drop of adhesive, wetting said end, and making a junction, wherein the adhesive-coated end of the movable member is applied against the hidden face of the membrane.

18. A method according to claim 17, wherein the transferring of the adhesive coating and the making of the junction are carried out collectively, by batch or by entire group of movable members.

* * * * *